United States Patent
Eberl

(10) Patent No.: US 6,722,931 B2
(45) Date of Patent: Apr. 20, 2004

(54) AMPHIBIAN BRIDGE-FORMING AND FERRYING VEHICLE

(75) Inventor: Klaus Eberl, St. Julian (DE)

(73) Assignee: General Dynamics Santa Bárbara Sistemas GmbH, Kaiserslautern (DE)

(*) Notice: Subject to any disclaimer, the term of this patent is extended or adjusted under 35 U.S.C. 154(b) by 0 days.

(21) Appl. No.: 10/353,820

(22) Filed: Jan. 29, 2003

(65) Prior Publication Data

US 2003/0143900 A1 Jul. 31, 2003

(30) Foreign Application Priority Data

Jan. 30, 2002 (EP) ............................................. 02002217

(51) Int. Cl.$^7$ ............................................. B63H 21/175
(52) U.S. Cl. ........................................ 440/12.5; 14/2.6
(58) Field of Search ..................... 14/2.6, 27; 440/12.5

(56) References Cited

U.S. PATENT DOCUMENTS

| | | | |
|---|---|---|---|
| 3,152,569 A | * | 10/1964 | Gehlen et al. .............. 114/258 |
| 3,581,701 A | * | 6/1971 | Gehlen ........................ 14/71.1 |
| 3,661,114 A | * | 5/1972 | Wagner et al. ........... 440/12.52 |
| 3,682,126 A | * | 8/1972 | Wagner et al. ................ 14/2.6 |
| 4,621,385 A | * | 11/1986 | Gillois ........................ 14/2.4 |

FOREIGN PATENT DOCUMENTS

| | | |
|---|---|---|
| DE | 1124383 | 2/1962 |
| DE | 1949206 | 4/1971 |
| DE | 3342087 | 5/1985 |
| DE | 3342088 | 5/1985 |

* cited by examiner

*Primary Examiner*—Stephen Avila
(74) *Attorney, Agent, or Firm*—Friedrich Kueffner

(57) ABSTRACT

An amphibian bridge-forming and ferrying vehicle has a self-propelled main floating body having a main deck and two foldable lateral floating bodies having a lateral deck, respectively. Two foldable, hydraulically liftable and lowerable folding ramps with a ramp base and a ramp tip are provided. The folding ramps are connected to the lateral floating bodies. The ramp tips rest against the topside of the ramp bases, respectively, when the folding ramps are in a folded position. The main deck, the lateral decks, and the folding ramps together form a continuous roadway.

10 Claims, 4 Drawing Sheets

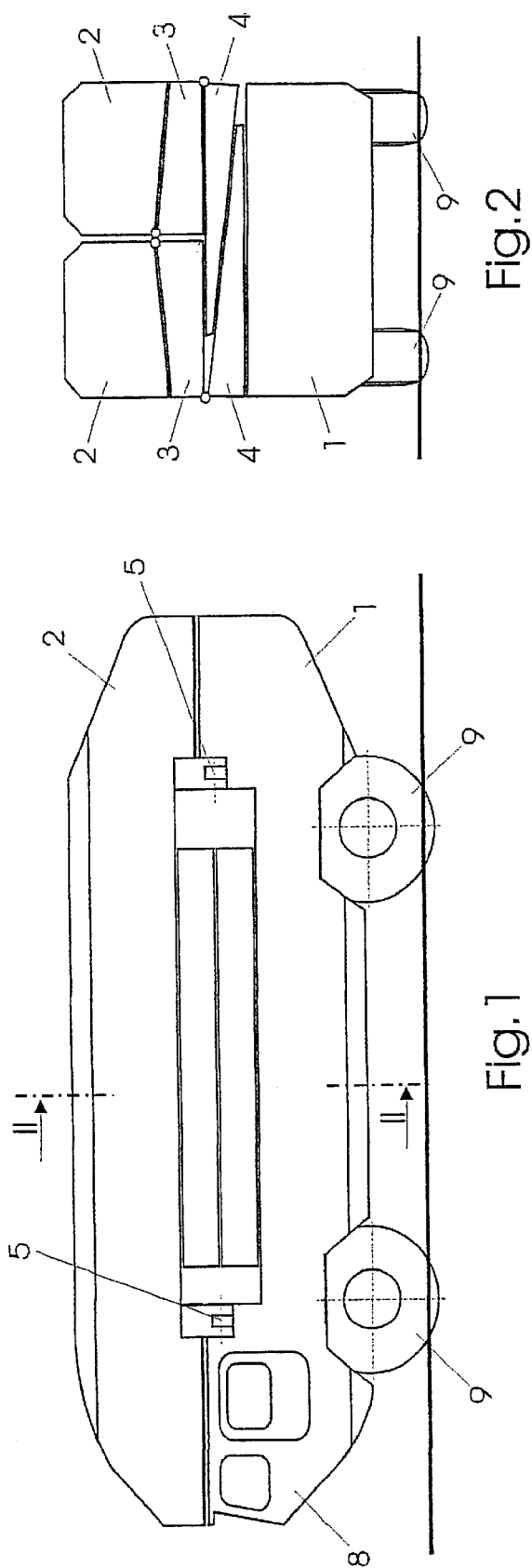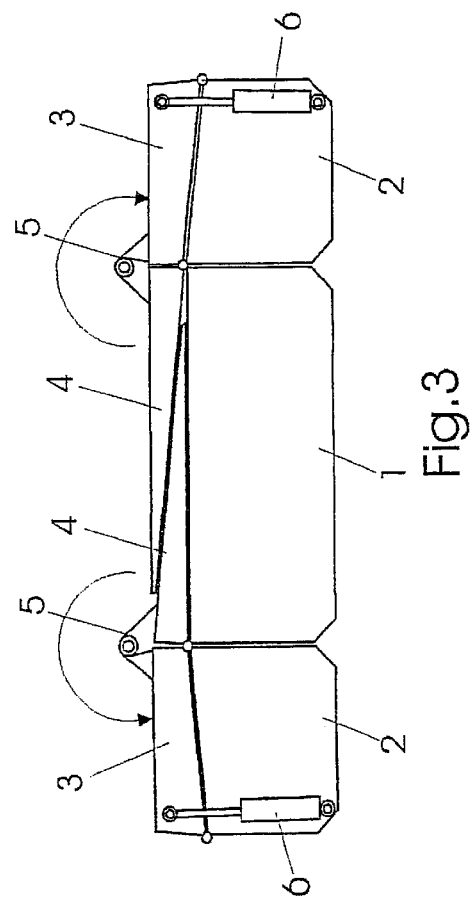

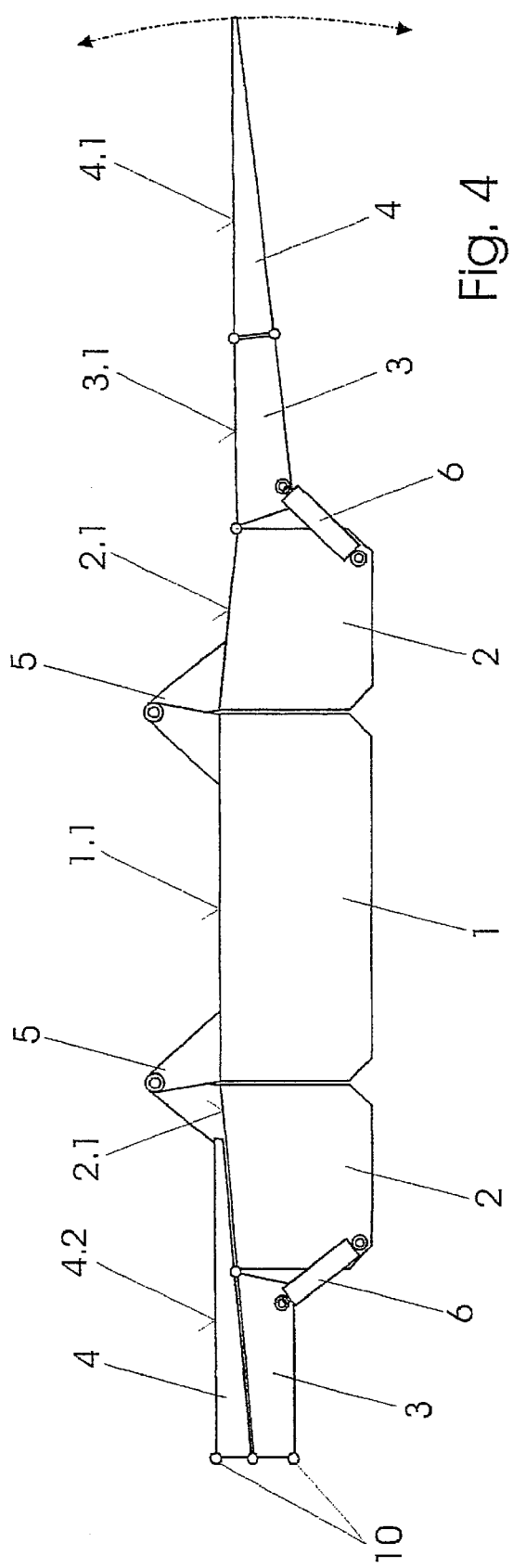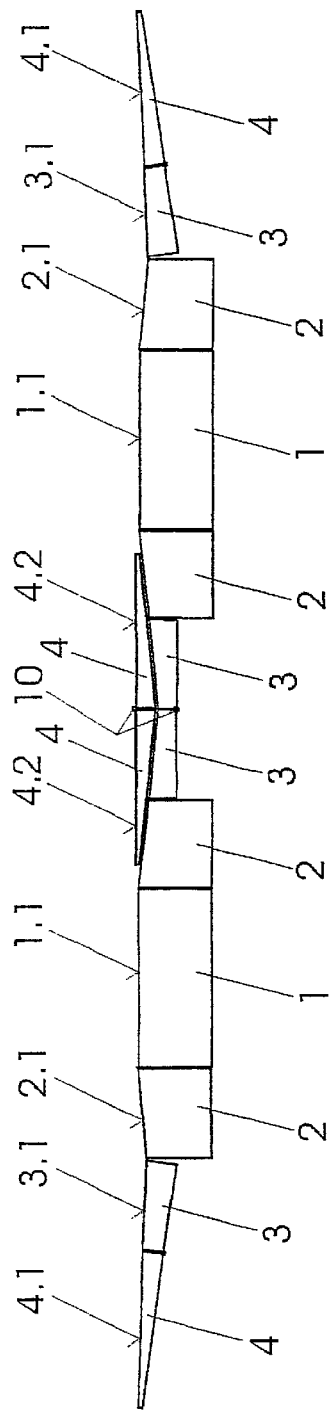

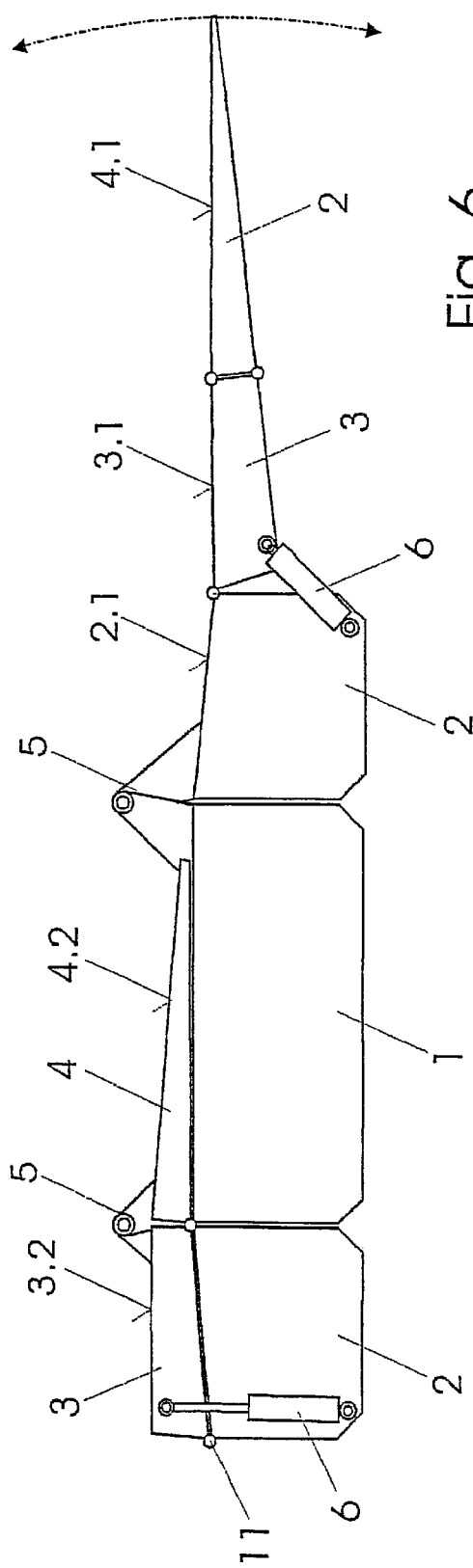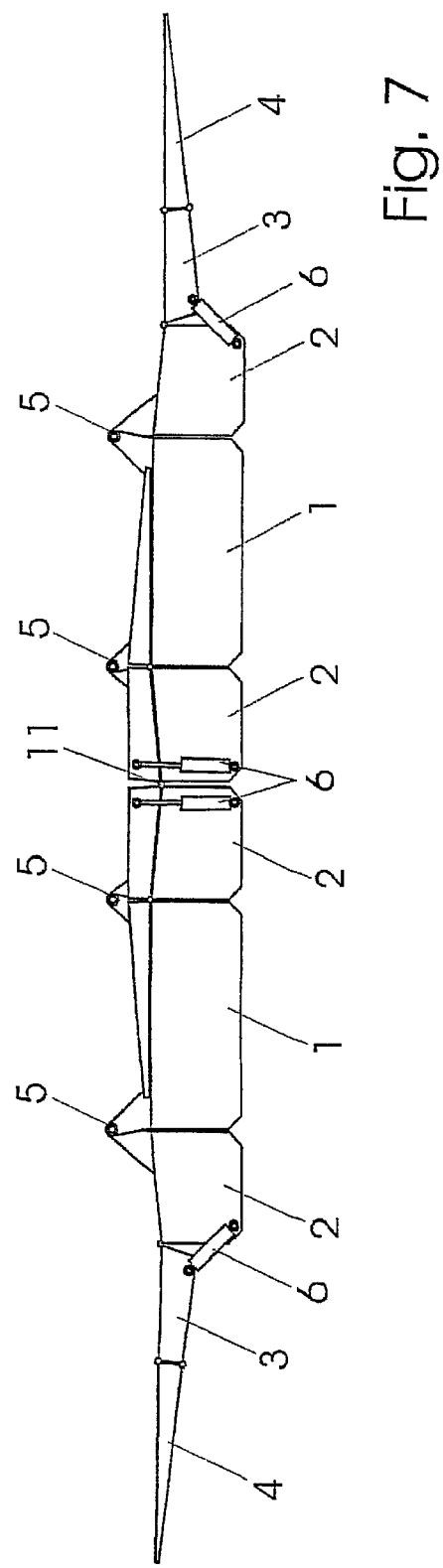

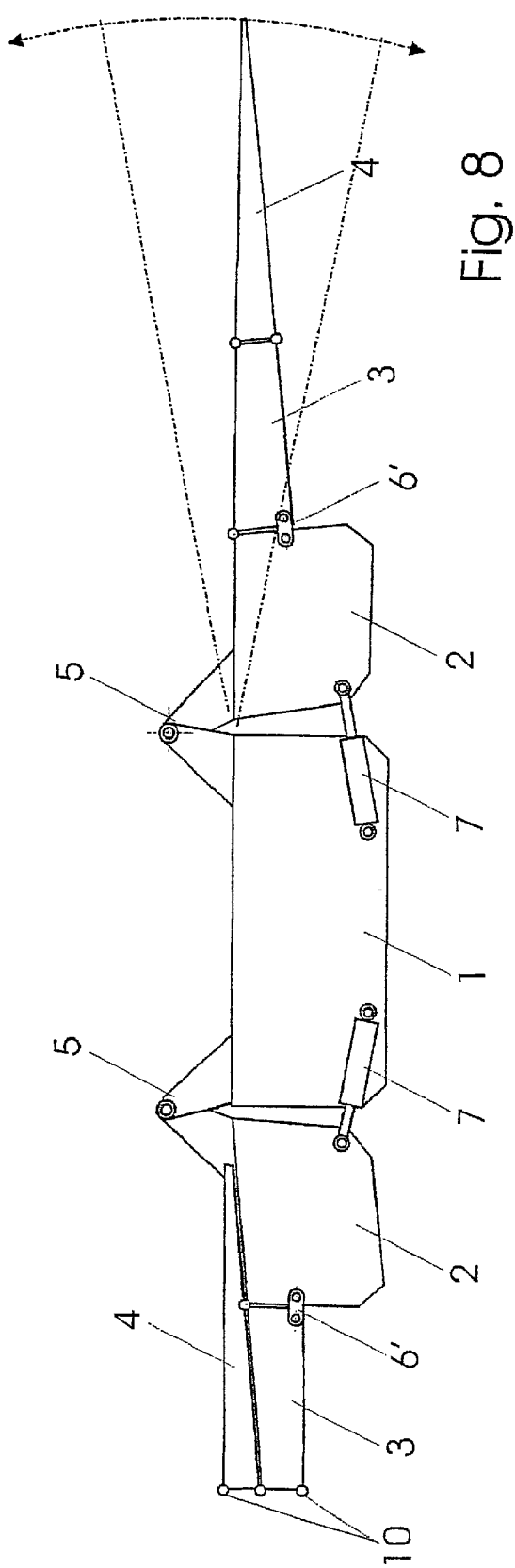
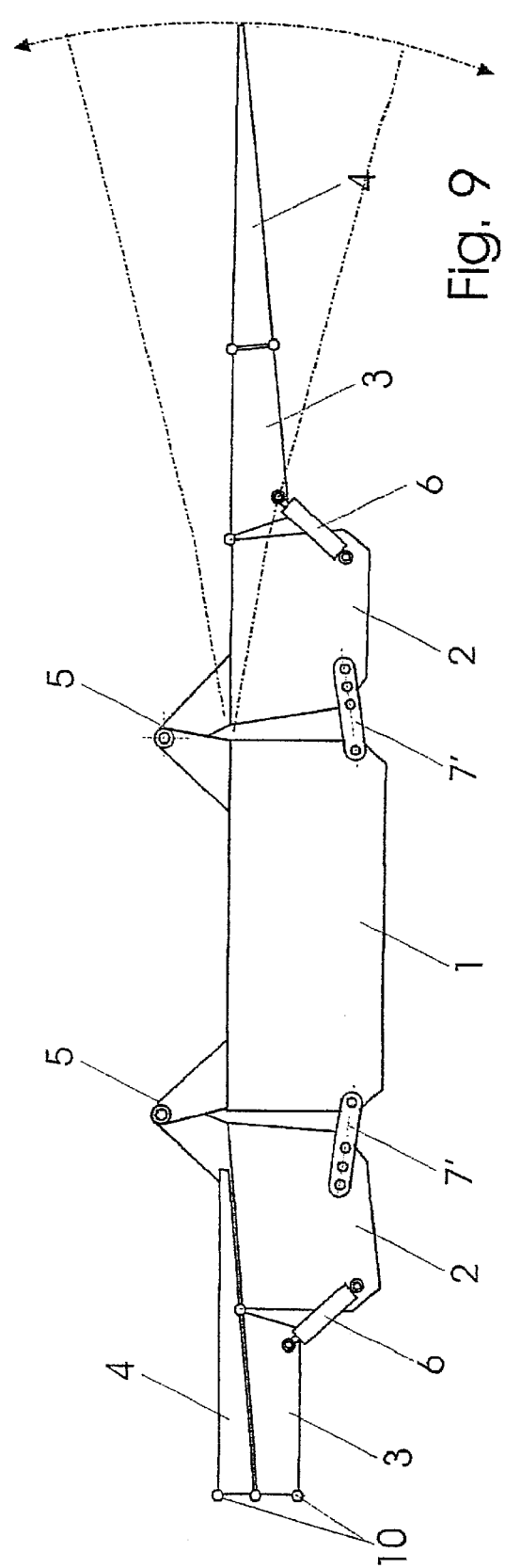

AMPHIBIAN BRIDGE-FORMING AND FERRYING VEHICLE

BACKGROUND OF THE INVENTION

1. Field of the Invention

The invention relates to an amphibian bridge-forming and ferrying vehicle, comprising essentially a self-propelled main floating body, two folding lateral floating bodies, and two laterally foldable, hydraulically liftable and lowerable folding ramps, each comprised of a ramp base and a ramp tip.

2. Description of the Related Art

Amphibian bridge-forming and ferrying vehicles are known from German published patent documents 11 24 383 A, 19 49 206 A, 33 42 087 A as well as 33 42 088 A. They are comprised essentially of a main floating body, which comprises the required components for propelling the vehicle on land or on water, and two lateral floating bodies. During propelling on land, the two lateral floating bodies are folded inwardly onto the main floating body in order to provide a narrow road-suitable contour. The vehicle can be driven into the water and move in the water with the lateral floating bodies in the folded position.

When the amphibian vehicle is to be used as a bridge or a ferry, the lateral floating bodies are hydraulically unfolded outwardly by 180 degrees so that a stable floating position and a great carrying capacity can be obtained; in this way, even great weights can be supported thereon.

In addition to the main floating body and the lateral floating bodies, the afore described amphibian vehicles are provided with ramps which enable a comfortable and safe connection from the bank or shore to the amphibian vehicle and from the amphibian vehicle to a neighboring amphibian vehicle. These ramps, when not in use, are stored adjacent and atop one another on the folded lateral floating bodies or in matching cutouts between the main floating body and the folded lateral floating bodies. In order to move the ramps from their transport position in the longitudinal direction of the amphibian vehicle into their position of use in a direction transverse to the transport direction, suitable assisting devices, for example, an on-board crane are provided on the main floating body. For moving the ramps and for operating the on-board crane, several persons are required as operating personnel. They must work on the deck of the amphibian vehicle where they are completely unprotected. This is unsatisfactory.

A further disadvantage of the known solution is that the individual ramp elements are relatively narrow, in particular, have a width less than half the width of the main floating body. This means that on each side of the amphibian vehicle two spaced-apart ramp elements are required when the roadway is needed for carrying heavy vehicles such as trucks or tanks. When it is desired, for safety reasons, to close the gap between the two ramps, additional roadway plates must be inserted which must be transported loosely on the amphibian vehicle.

Initially, those ramps were rigid. However, this limited their length to the length of the amphibian vehicle. In subsequent developments, so-called folding ramps have been used. They are stored in the folded state on the amphibian vehicle when not in use. In the position of use, they can be unfolded so as to have almost twice the length of the amphibian vehicle. Such folding ramps are described in German published patent documents 19 49 206 A, 33 42 087 A, and 33 42 088 A. The configuration described in 19 49 206 A has moreover the advantage that for moving the folding ramps from the transport position into the position of use, an onboard crane is not required because the folding ramps are connected to an upright center part provided on the deck of the main floating body and rotatable about a vertical axis. The folding ramps are comprised of a ramp base, which is connected to the rotatable center part and can be lifted and lowered by means of hydraulic cylinders, and a ramp tip, which is connected to the free end of the ramp base and can be pivoted, also by hydraulic cylinders, about 180 degrees. The hinge between the ramp base and the ramp tip is configured such that the ramp tips rest against the underside of the ramp base in the transport position.

Additionally, an amphibian bridge-forming and ferrying vehicle is being used in which the folding ramps are connected to the front and the rear of the self-propelled main floating body. For increasing the carrying capacity, the ramp bases are provided with their own floating bodies. An advantage of this vehicle is its great length, comprised of the length of the two folding ramps and the length of the main floating body, as well as its great carrying capacity. However, one problem is that the main floating body must have a great width because of the required roadway width for the above-mentioned large and heavy vehicles. Such a wide contour however impedes fast propelling on land and on water. Also, when the ramps are unfolded, the operating personnel practically has no visibility from the cockpit.

SUMMARY OF THE INVENTION

It is an object of the present invention to provide an amphibian bridge-forming and ferrying vehicle which combines a narrow transport contour with a great bridge length and high carrying capacity.

In accordance with the present invention, this is achieved in that the vehicle has the following features:

a self-propelled main floating body;

two foldable lateral floating bodies;

two laterally foldable, hydraulically liftable and lowerable folding ramps, each comprised of a ramp base and a ramp tip, respectively;

the folding ramps are connected to the lateral floating bodies;

the ramp tips, when the floating ramp is in the folded position, rest on the topside of the ramp base;

the decks of the main floating body and of the lateral floating bodies form a continuous roadway together with the folding ramps.

The present invention also employs folding ramps which however are connected on the outer longitudinal sides of the unfolded lateral floating bodies. At the same time, the decks of the main floating body and of the lateral floating bodies provide a roadway so that the bridge length with the folding ramps unfolded is correspondingly enlarged. The topside as well as the underside of the folding ramps are used as a roadway. Moreover, almost the entire length of the main floating body is available as a roadway width so that the roadway can be used safely even in the case of problem loads under problematic conditions. When the amphibian vehicle is used as a ferry, a large base surface area is available for transport.

Further advantages of the invention reside in that the ramp tips, in contrast to the prior art, are folded against the topside and not the underside of the ramp base. In this way, in the case of the folding ramp being in the folded position, the complete ramp adjusting travel in the downward direction is maintained and the overload safety provided by the pressure relief valves on the ramps cylinders remains effective.

Since in the vehicle according to the invention the folding ramps in the transport position (folded position) are arranged on the main floating body transversely to the longitudinal direction of the vehicle, they must not be rotated before being unfolded. Also, no loose parts must be handled anymore. In this way, it is possible to control all folding and unfolding steps from the interior of the vehicle, optionally by means of a computer. The operating personnel no longer must leave the protected vehicle area.

According to a first embodiment of the invention, the folding ramps have a wedge-shaped cross-section and the deck of the lateral floating bodies is slanted in a complementary or matching way. In this way, the folding ramps can be placed or stored without gaps on the lateral floating bodies. A planar roadway thus results because of the wedge shape.

As mentioned above, all of the pivoting steps are realized by hydraulic cylinders provided on the vehicle. In special cases, it can however be advantageous when certain elements are rigidly coupled to one another. In this connection, the hinges between the lateral floating bodies and the ramp base or between the main floating body and the lateral floating bodies come to mind. In these cases, rigid coupling brackets can be mounted.

In particular, in the area between the main floating body and the lateral floating bodies, multi-stage, in particular, three-stage coupling brackets were found to be advantageous. In this way, the ramp adjusting stroke can be significantly enlarged for the maximum ramp slant still permitting driving.

It is understood that between the ramp base and the ramp tip detachable hinge couplings must be provided in order to provide a bending-resistant connection of the two elements. These hinge couplings however also provide the possibility of coupling the folded ramps of two neighboring amphibian vehicles with one another in order to provide in this way a ferry of twice the width or a bridge of a corresponding great length.

BRIEF DESCRIPTION OF THE DRAWING

In the drawing:

FIG. 1 shows a side view of an amphibian bridge-forming and ferrying vehicle in the position for transport on land;

FIG. 2 shows a cross-section along the line II—II of the amphibian vehicle according to FIG. 1;

FIG. 3 shows the vehicle of FIG. 2 with the lateral floating bodies in the unfolded position;

FIG. 4 shows the vehicle of FIG. 3 with the folding ramps shown in different folding positions;

FIG. 5 shows a ferry formed of two amphibian vehicles coupled along their short edges;

FIG. 6 shows the vehicle of FIG. 3 in another operating position;

FIG. 7 shows a ferry formed of two amphibian vehicles in the operating position according to FIG. 6;

FIG. 8 shows the amphibian vehicle of FIG. 4 with a first configuration of a landing ramp; and FIG. 9 shows the vehicle of FIG. 4 with a second configuration of the landing ramp.

DESCRIPTION OF THE PREFERRED EMBODIMENTS

FIG. 1 is a side view of an amphibian bridge-forming and ferrying vehicle in the position for transport on land; FIG. 2 is a cross-section along the line II—II of FIG. 1. The vehicle has a self-propelled main floating body 1 with a cockpit 8 and an undercarriage 9. Two lateral floating bodies 2 are connected by means of hinges 5 to the main floating body 2. Between the main floating body 1 and the lateral floating bodies 2 a cutout is formed in which two folding ramps 3, 4 are arranged. These folding ramps are comprised of a ramp base 3 and a ramp tip 4. The folding ramps 3, 4 are connected to the outer longitudinal edges of the lateral floating bodies 2 and have a wedge-shaped cross-section. The lateral deck of the lateral floating bodies 2 has a matching slanted shape. In this way, in the transport position illustrated in FIGS. 1 and 2, all parts 1, 2, 3, 4 fit into one another without a gap or a spacing remaining therebetween. The width of the folding ramps 3, 4 corresponds to a substantial portion of the length of the main floating body 1.

FIG. 3 shows the vehicle of FIG. 2 with unfolded lateral floating bodies 2. The wheels 9 for transport on land are not illustrated for simplifying the illustration. Both folding ramps 3, 4 are positioned flat on the main deck of the main floating body 1 and the lateral decks of the lateral floating bodies 2. Because of the wedge-shape of the ramps 3 and 4 and of the matchingly slanted lateral decks of the lateral floating bodies 2, the underside of the folding ramps 3, 4 provide a substantially planar roadway. It is understood that for this purpose not only the topsides of the folding ramps 3, 4 but also their undersides are configured as a roadway.

FIG. 4 shows as a first practical embodiment the vehicle of FIG. 3 with folding ramps 3, 4 in different folding positions. On the right side, the folding ramp 3, 4 is in the unfolded and stretched state. Ramp base 3 and ramp tip 4 are fixedly coupled to one another. Hydraulic cylinders 6 between the lateral floating body 2 and the folding ramps 3, 4 enable lifting and lowering of the ramp tips.

On the left side, the ramp tip 4 rests flat on the ramp base 3 and the lateral deck 2.1 of the lateral floating body 2. By means of a hydraulic cylinder 6, the ramp 3, 4 can be lifted and lowered relative to the lateral floating body 2. In this configuration, the roadway is formed by the underside 4.2 of the left ramp tip 4, the lateral deck 2.1 of the lateral floating body 2, the main deck 1.1 of the main floating body 1, and the topsides 3.1, 4.1 of the right folding ramp 3, 4.

FIG. 5 shows a ferry, formed of two amphibian vehicles, whose ramps according to FIG. 4 are partially in the folded state and unfolded state. The two vehicles are coupled on the side with the folding ramps in the folded state. Coupling is effected by means of hinge couplings 10 provided, on the one hand, on the ramp base 3 and, on the other hand, on the ramp tip 4.

FIG. 6 shows a further operational position of the folding ramps 3, 4. On the right side, the folding ramp 3, 4 is completely unfolded and can be lifted and lowered by means of the hydraulic cylinders 6. On the left side, the folding ramp 3, 4 is also unfolded but rests flat against the lateral floating bodies 2 and the main floating body 1. In this position, the roadway is formed by the undersides 3.2, 4.2 of the left folding ramp 3, 4, the lateral deck 2.1 of the right lateral floating body 2, and the topside 3.1, 4.1 of the right folding ramp 3, 4.

FIG. 6 shows that the length of the ramp base 3 coincides with the width of the lateral floating body 2 and that the length of the ramp tip 4 corresponds approximately to the width of the main floating body 1.

FIG. 7 shows a ferry which is combined of two amphibian vehicles whose folding ramps are positioned as shown in FIG. 6. The connection of the two vehicles is realized in the area of the lateral floating bodies 2 which have suitable coupling eyes 11 for this purpose.

As can be seen in the preceding embodiments, the pivoting of the lateral floating bodies 2 relative to the main floating body 1 is realized by means of hydraulic cylinders 7 and pivoting of the folding ramps 3, 4 relative to the lateral floating bodies 2 by means of hydraulic cylinders 6. However, it was found that in certain applications a rigid connection can be advantageous. This holds true in particular when one of the folding ramps 3, 4 is used as a landing ramp.

FIG. 8 shows a first embodiment with a rigid connection between the lateral floating bodies 2 and the folding ramps 3, 4. Between the two parts a rigid coupling bracket 61 is provided. It can either replace the hydraulic cylinders 6 or can bridge them rigidly.

FIG. 9 shows a second embodiment of a rigid connection between the main floating body 1 and the lateral floating bodies 2. A rigid coupling bracket 7' is provided which either replaces the hydraulic cylinders 7 or bridges them rigidly. In the illustrated example, the coupling brackets 71 are of a three-stage configuration providing three coupling stages so that the angle between the main floating body 1 and the lateral floating body 2 can be rigidly set in three steps. More or fewer than three stages can be provided. The fine adjustment of the free ramp tip is realized by means of the hydraulic cylinders 6.

While specific embodiments of the invention have been shown and described in detail to illustrate the inventive principles, it will be understood that the invention may be embodied otherwise without departing from such principles.

What is claimed is:

1. An amphibian bridge-forming and ferrying vehicle, comprising:

a self-propelled main floating body having a main deck;

two foldable lateral floating bodies having a lateral deck, respectively;

two foldable, hydraulically liftable and lowerable folding ramps comprised of a ramp base and a ramp tip, respectively;

wherein the folding ramps are connected to the lateral floating bodies;

wherein the ramp tips rest against the topside of the ramp bases, respectively, when the folding ramps are in a folded position;

wherein the main deck, the lateral decks, and the folding ramps together form a continuous roadway.

2. The amphibian vehicle according to claim 1, wherein the folding ramps have a wedge-shaped cross-section and wherein the lateral decks have a matching slanted shape.

3. The amphibian vehicle according to claim 1, further comprising first hydraulic cylinders connected to the lateral floating bodies and the ramp bases and second hydraulic cylinders connected to the main floating body and the lateral floating bodies.

4. The amphibian vehicle according to claim 1, further comprising first rigid coupling brackets connected to the lateral floating bodies and the ramp bases and second rigid coupling brackets connected to the main floating body and the lateral floating bodies.

5. The amphibian vehicle according to claim 4, wherein the first and second rigid coupling brackets have several coupling stages.

6. The amphibian vehicle according to claim 1, further comprising detachable hinge couplings connecting the ramp bases and the ramp tips.

7. The amphibian vehicle according to claim 1, wherein the lateral floating bodies have coupling eyes arranged at an outer side of the lateral floating bodies.

8. The amphibian vehicle according to claim 1, wherein each one of the lateral floating bodies has only one of the folding ramps connected thereto.

9. The amphibian vehicle according to claim 1, wherein a length of the ramp bases matches a width of the lateral floating bodies.

10. The amphibian vehicle according to claim 1, wherein a length of the ramp tips matches a width of the main floating body.

* * * * *